July 4, 1961 D. E. DAVIDSON 2,991,096
FRICTION LOCK FOR TELESCOPING SLEEVES
Filed Dec. 30, 1958
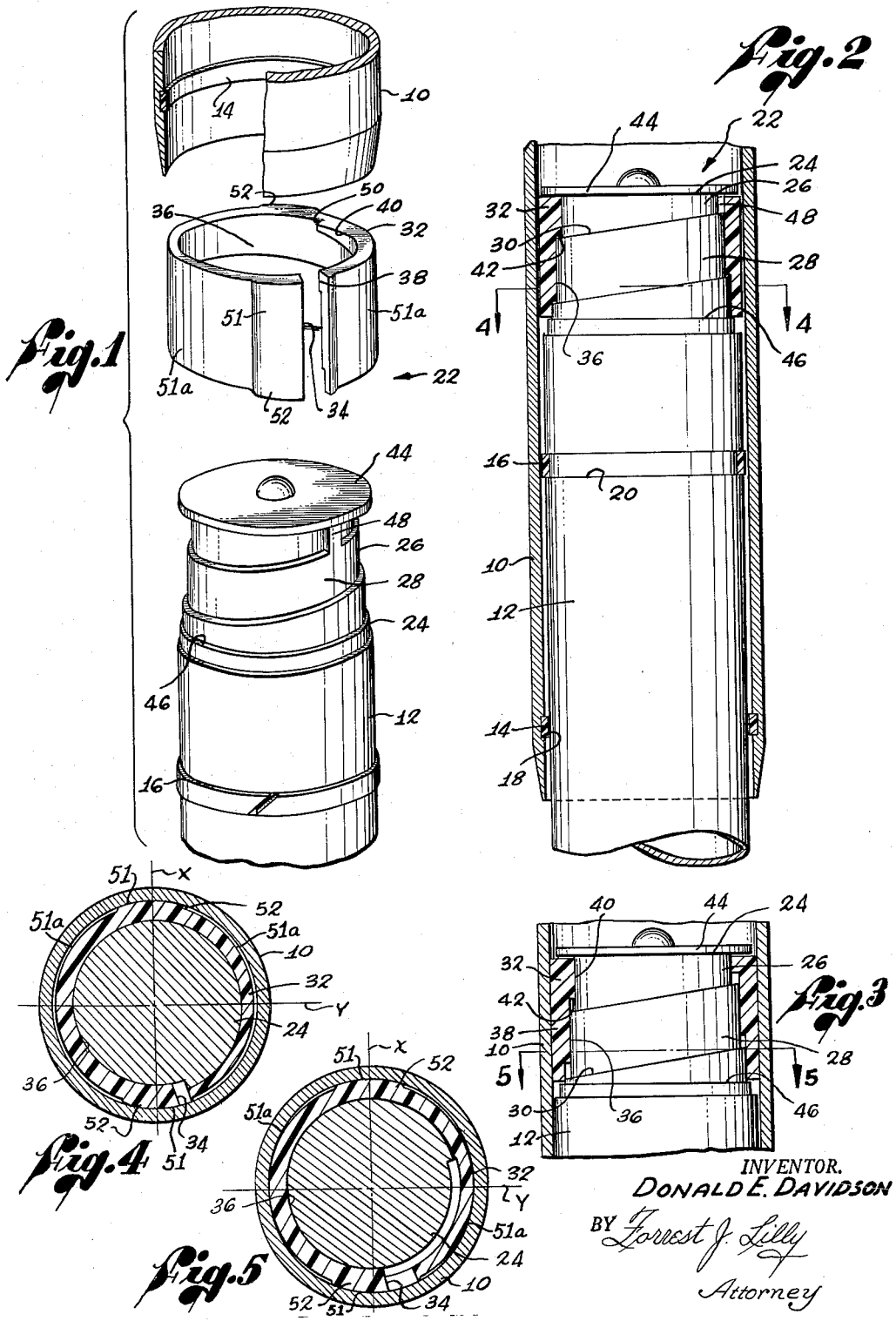
INVENTOR.
DONALD E. DAVIDSON
BY Forrest J. Lilly
Attorney

United States Patent Office 2,991,096
Patented July 4, 1961

2,991,096
FRICTION LOCK FOR TELESCOPING SLEEVES
Donald E. Davidson, La Habra, Calif., assignor to Davidson Optronics Inc., West Covina, Calif., a corporation of California
Filed Dec. 30, 1958, Ser. No. 783,741
6 Claims. (Cl. 287—58)

This invention deals with friction locks for telescoping sleeves and has as its general object the provision of a new and improved friction lock of this character.

A more specific object of the invention is to provide a friction lock of the character described which is relatively immune to jamming and other forms of malfunctioning.

Another object of the invention is to provide a friction lock of the character described which is capable of effecting its friction locking action on telescoping sleeves having a relatively large dimensional tolerance.

Yet another object of the invention is to provide a friction lock of the character described which comes to a positive stop when locked so as to afford an indication to the user that the lock is firmly set.

A further object of the invention is to provide a friction lock of the character described which is simple in construction, inexpensive to manufacture, and otherwise especially well suited to its intended use.

Briefly stated, the above and other objects of the invention are attained by the provision of a friction sleeve lock in which a friction locking action is achieved by a pair of engaging, helical wedge formations on a part rigid on the inner telescoping sleeve and on a yieldably expandable friction collar which is rotatable on the part. This collar has an outer friction surface which, when the lock is released, engages the inner surface of the outer telescoping sleeve with a light frictional contact so as to permit telescopic adjustment of the sleeves.

When the sleeves are relatively rotated, inclined helical wedge surfaces on the wedge formations ride over one another to expand the collar tightly against the outer sleeve so as to lock the sleeves against telescopic movement.

The friction collar is shaped to cause initial expansion of the outer sleeve in the direction of one diametrical axis of the outer sleeve, during setting of the lock, and subsequent contact of the collar with the outer sleeve along a diametrical axis of the outer sleeve normal to said one axis. This latter contact affords a positive-stop-like indication that the lock is firmly set.

A better understanding of the invention may be had from the following detailed description thereof, taken in connection with the annexed drawings, wherein:

FIG. 1 is an exploded, perspective view of the present sleeve lock;

FIG. 2 is a longitudinal sectional view through the sleeve lock showing its parts in released position;

FIG. 3 is a partial view similar to FIG. 2 but showing the parts of the lock in locked position;

FIG. 4 is a section taken along line 4—4 of FIG. 2; and

FIG. 5 is a section taken along line 5—5 of FIG. 3.

In these drawings, the numerals 10 and 12 denote a pair of slidably telescoping sleeves which may comprise, for example, one leg of a camera tripod. As may be observed most clearly in FIG. 2, the inner diameter of the outer sleeve 10 is slightly greater than the outer diameter of the inner sleeve 12.

Indicated at 14 and 16 are a pair of bearing rings for slidably supporting the inner sleeve in the outer sleeve. Ring 14 seats in an internal annular groove 18 in the outer sleeve and slidably engages the outer surface of the inner sleeve. Ring 16 seats in a groove 20 in the inner sleeve and slidably engages the inner surface of the outer sleeve.

The present friction lock 22, for locking the sleeves 10 and 12 in adjusted axial position, comprises an axial tapered part 24 rigid on the inner end of the inner sleeve 12. This part may be an integral part of the inner sleeve. Preferably, however, the part is separately formed, by die casting, for example, and rigidly fixed to the sleeve.

Part 24 is externally formed with a helical wedge formation 26. This formation has a helical, inclined or wedge surface 28 which parallels the axis of sleeves 10 and 12. Wedge surface 28 spirals inwardly of the part 24 toward the upper, small diameter end of the part.

It will be observed that part 24 is distinctly different from a tapered part that is threaded. That is, in part 24, adjacent turns of the helical wedge formation 26 are not separated by a helical groove, as would be the case if the part were simply threaded. Thus, the helical wedge surface 28 of each turn extends from one adjacent turn of the helical wedge, to the other adjacent turn. The juncture of adjacent turns defines a narrow helical, spiral ramp surface or shoulder 30.

Rotatably fitted on the part 24 is a yieldably expandable friction collar 32. This collar is made of nylon or other suitable material and is made expandable by a slit 34, for example.

Collar 32 has an axially tapered central opening 36 which receives and generally complements the helical wedge part 24. Formed on the wall of this opening is a helical wedge formation 38 generally similar to the wedge formation 26.

Wedge formation 38 includes a helical inclined or wedge surface 40 which parallels the axis of the sleeves 10 and 12 and slidably engages the helical wedge surface 28 on part 24. Wedge surface 40 spirals inwardly of the collar toward the small diameter end of the collar opening 36. Adjacent turns of the helical wedge formation 38 form therebetween a helical, spiral ramp surface or shoulder 42 which faces the shoulder 30 in part 24.

When the friction lock 22 is released, the outer surface of the friction collar 32 engages the inner surface of the outer sleeve 10 with a light frictional contact so as to permit telescopic adjustment of the sleeves. A washer 44, fixed to the upper end of the tapered part 24, provides a shoulder which, together with a shoulder 46 at the lower end of the part, retains the collar 32 against axial movement on the tapered part during such telescopic adjustment of the sleeves.

The light frictional contact of the collar with the outer sleeve, however, retains the collar stationary with respect to the outer sleeve when the sleeves are relatively rotated. If the inner sleeve is turned in a counterclockwise direction, as viewed in FIGS. 4 and 5, from its position of FIGS. 2 and 4 wherein the friction lock 22 is released, the wedge part 24 turns inside the friction collor 32. In this case, the helical wedge surface 28 on the tapered part 24 slides over the wedge surface 40 on the collar in a direction to expand the latter into tight frictional contact with the outer sleeve. This, of course, locks the sleeves against telescopic movement.

When the inner sleeve is turned in the opposite direction, the friction collar again remains stationary and the wedge part 24 turns in the collar in a direction to permit the latter to contract to its normal condition. Thus, the telescopic sleeves may be locked against and released for telescopic adjustment simply by relatively turning thereof in one direction or the other.

It will be observed that during operation of the friction lock between its released position of FIG. 2 and its locked position of FIG. 3, the axially facing ramp surfaces 30 and 42 on part 24 and collar 32, respectively, are never in forced contact so as to impart axial movement to the collar. On the contrary, the collar is retained against axial movement by the shoulders 44, 46.

Thus, the collar is not expanded and allowed to contract as a result of any axial movement on part 24. Rather, expansion and contraction of the collar is due entirely to relative angular movement of the helical wedge surfaces 28 and 40 past one another during relative rotation of the sleeves.

This type of wedging action is desirable for three reasons. First, it has been found that the frictional forces acting between the part 24 and collar 32 are always less than those acting between the collar and outer sleeve. As a result, the tendency for the collar to frictionally bind to and turn or remain stationary with the wedge part 24, which would prevent release of the lock, is avoided.

Secondly, the total length of the helical wedge surfaces is appreciable. These surfaces, therefore, may be given a sufficient rise to assure a frictional locking action with different sleeves having relatively large dimensional tolerance.

Thirdly, the telescopic sleeves do not move axially with respect to one another when the friction lock is set so that the adjusted overall length of the sleeves remains fixed during setting of the lock.

To avoid any possibility of the friction collar becoming wedged against the shoulder or washer 44 during release of the lock, an abutment or stop 48 is provided on the upper end of the wedge part 24. This stop is engageable by a stop shoulder 50 on the friction collar at the upper end of its helical wedge surface 40 to limit clockwise turning, as viewed in FIG. 4, of part 24 in the collar to a position short of a wedging position.

It is highly desirable that a friction lock of this type embody means for indicating when the lock is firmly set, first so that the lock will not inadvertently be left in other than its fully locked condition, and second to avoid the possibility of the user over-tightening the lock.

To this end, the friction collar 32 is provided with a pair of diametrically opposed friction surfaces 51 which are located at a slightly greater radial distance from the axis of the collar than are the friction surfaces 51a of the collar between the surfaces 51. This may be accomplished, for example, by forming a pair of raised, diametrically opposed ribs or pads 52, having the friction surfaces 51, on the outside of the friction collar. The outer friction surfaces 51 of these pads have a light frictional contact with the outer sleeve when the friction lock 22 is released which permits the sleeves 10 and 12 to be moved axially with respect to one another but which restrains the friction collar against turning with respect to the outer sleeve 10 when the sleeves are rotated relative to one another to set the friction lock.

When the collar is expanded by relative turning of the sleeves 10 and 12, these pads are initially urged tightly against the outer sleeve and expand the latter slightly along the X axis, as shown in FIG. 5. This action, of course, draws the outer sleeve in along the Y axis.

Continued tightening of the lock, therefore, eventually brings the friction collar into contact with the outer sleeve between the pads 52 as shown in FIG. 5. This contact acts like a positive stop which prevents any further tightening of the lock. By the time this positive stop is felt by the user, of course, the pads 52 will have been pressed tightly against the outer sleeve so as to firmly lock the latter to the inner sleeve. The same effect could be achieved in other ways, such as by providing diametrically opposed flats, rather than raised pads, on the collar.

It will be apparent, therefore, that there has been described and illustrated a friction lock for telescoping sleeves which is fully capable of attaining the objects and advantages preliminarily set forth.

Numerous modifications in the design and arrangement of parts of the invention are, of course, possible within the scope of the following claims.

I claim:
1. A friction lock for a pair of slidably telescoping sleeves, comprising an axially extending part on the inner sleeve, a radially expandable friction collar rotatable on said part and having a pair of outer, diametrically opposed friction surfaces engaging the inner surface of the outer sleeve with a light frictional contact in one relative angular position of said collar and part so as to permit telescopic adjustment of said sleeves, said diametrically opposed friction surfaces being at a slightly greater radial distance from the axis of the collar than the friction surfaces of the collar between said diametrically opposed friction surfaces, said collar remaining stationary with respect to the outer sleeve during relative rotation of said sleeves, and cooperating means on said part and collar for expanding the latter into tight frictional contact with the outer sleeve upon relative rotation of said part in the collar in one direction from said one angular position, whereby during expansion of the collar against the outer sleeve, the latter is expanded slightly by the collar in the direction of the diametrical axis of the outer sleeve passing through said diametrically opposed friction surfaces and the outer sleeve is then drawn inwardly into contact with the collar along a diametrical axis normal to said first-mentioned diametrical axis to afford a positive-stop-like indication that the friction lock is set.

2. The subject matter of claim 1 wherein said friction collar has a pair of diametrically opposed, raised pads located on said first-mentioned diametrical axis and said diametrically opposed friction surfaces comprise the outer surfaces of said pads.

3. A friction lock for a pair of slidably telescoping sleeves, comprising an axially tapered, generally cone-shaped part rigid on the inner sleeve and formed with an external helical wedge formation including a first radially outwardly facing helical wedge surface which parallels the axis of the sleeves and spirals inwardly of the tapered part toward the small diameter end of the part, a yieldably expandable friction collar having an axially tapered, generally cone-shaped central opening rotatably receiving and generally complementing said tapered part and an outer friction surface which engages the inner surface of the outer sleeve with a light frictional contact in one relative angular position of said collar on the tapered part whereby to permit relative telescopic adjustment of said sleeves, shoulder means at opposite ends of said tapered part engageable with the ends of said collar to retain the latter against axial movement on the part while permitting the tapered part to turn in the collar, the wall of said opening being formed with a helical wedge formation including a second, radially inwardly facing helical wedge surface slidably engaging said first wedge surface, said second wedge surface paralleling said axis and spiralling inwardly of the collar toward the small diameter end of the opening, said light frictional contact between the outer sleeve and said collar retaining the latter stationary with respect to the outer sleeve during relative rotation of said sleeves whereby relative rotation of the sleeves in one direction causes said wedge surfaces to rotate past one another in a direction to expand said collar into tight frictional contact with the outer sleeve and thereby lock the sleeves against relative telescopic movement, relative rotation of the sleeves in the opposite direction releasing said sleeves for said relative telescopic movement, and said wedge formations defining axially facing shoulders on the tapered part and collar which are axially spaced so that said relative rotation of the sleeves does not cause relative axial movement of the tapered part and collar.

4. The subject matter of claim 3 wherein said first-mentioned shoulder means comprises an annular shoulder at the small diameter end of the tapered part engageable with the adjacent end of the collar, and cooperating stop means on said tapered part and collar for limiting turning of the tapered part in the collar during relative rotation of the sleeves in said opposite direction to prevent wedging of said collar against said annular shoulder.

5. The subject matter of claim 3 wherein said collar is axially split to lend flexibility thereto.

6. The subject matter of claim 3 wherein said friction surface of the collar comprises a pair of diametrically opposed friction surfaces at a given radial spacing from the axis of the collar and having said light frictional contact with the outer sleeve in said angular position of the collar on the tapered part and friction surfaces between said pair of diametrically opposed friction surfaces and located at a radial distance from said collar axis less than said given radial distance, whereby during expansion of the collar against the outer sleeve, the latter is expanded slightly by the collar in the direction of the diametrical axis of the outer sleeve passing through said diametrically opposed friction surfaces and the outer sleeve is then drawn inwardly into contact with the collar along a diametrical axis normal to said first-mentioned diametrical axis, and subsequently engages the collar along the shorter axis of the ellipse to afford a positive stop-like indication that the friction lock is set.

References Cited in the file of this patent
UNITED STATES PATENTS

| | | |
|---|---|---|
| 1,821,877 | Bowne | Sept. 1, 1931 |
| 2,111,244 | Hueglin | Mar. 15, 1938 |
| 2,298,380 | Hood | Oct. 13, 1942 |
| 2,526,415 | Refsdal | Oct. 17, 1950 |
| 2,644,978 | Becker | July 14, 1953 |